(12) United States Patent
Dole et al.

(10) Patent No.: US 8,500,834 B2
(45) Date of Patent: Aug. 6, 2013

(54) SINTERED COMPACT

(75) Inventors: Stephen Dole, Columbus, OH (US); Dwight Dyer, Kingston, OH (US); Rajeev Pakalapati, Santa Barbara, CA (US); James McHale, Hillsborough, NJ (US)

(73) Assignee: Diamond Innovations, Inc., Worthington, OH (US)

( * ) Notice: Subject to any disclaimer, the term of this patent is extended or adjusted under 35 U.S.C. 154(b) by 0 days.

(21) Appl. No.: 12/848,892

(22) Filed: Aug. 2, 2010

(65) Prior Publication Data

US 2011/0059311 A1  Mar. 10, 2011

Related U.S. Application Data

(63) Continuation-in-part of application No. 11/062,199, filed on Feb. 18, 2005, now Pat. No. 7,932,199.

(60) Provisional application No. 60/546,669, filed on Feb. 20, 2004.

(51) Int. Cl.
- *B24D 3/02* (2006.01)
- *C04B 35/00* (2006.01)
- *C04B 35/56* (2006.01)

(52) U.S. Cl.
USPC ............... 51/307; 501/96.4; 501/89; 501/127

(58) Field of Classification Search
USPC .................... 51/307; 501/89, 97.7, 127, 153, 501/96.4
See application file for complete search history.

(56) References Cited

U.S. PATENT DOCUMENTS

| | | |
|---|---|---|
| 3,743,489 A | 7/1973 | Wentorf, Jr. et al. |
| 4,334,928 A | 6/1982 | Hara et al. |
| 4,343,651 A | 8/1982 | Yazu et al. |
| 4,389,465 A | 6/1983 | Nakai et al. |
| 4,619,698 A | 10/1986 | Ueda et al. |
| 4,666,466 A | 5/1987 | Wilson |
| 4,906,528 A | 3/1990 | Cerceau et al. |
| 4,907,377 A | 3/1990 | Csillag et al. |
| 4,911,756 A | 3/1990 | Nakai et al. |
| 5,034,053 A | 7/1991 | Nakai et al. |
| 5,041,399 A | 8/1991 | Fukaya et al. |
| 5,328,875 A | 7/1994 | Ueda et al. |
| 5,466,642 A | 11/1995 | Tajima et al. |
| 5,830,813 A | 11/1998 | Yao et al. |
| 6,331,497 B1 | 12/2001 | Collier et al. |
| 6,814,775 B2 * | 11/2004 | Scurlock et al. ............. 75/244 |
| 2004/0002418 A1 | 1/2004 | Scurlock et al. |

FOREIGN PATENT DOCUMENTS

| | | |
|---|---|---|
| EP | 0626237 | 8/1996 |
| JP | 59153851 | 9/1984 |
| JP | 60086225 | 5/1985 |
| JP | 782031 | 3/1995 |
| JP | 07133154 | 5/1995 |
| JP | 08109070 | 4/1996 |
| JP | 08253837 | 10/1996 |
| JP | 2000218411 | 8/2000 |
| JP | 8126903 | 9/2000 |
| JP | 2000247746 | 9/2000 |

* cited by examiner

*Primary Examiner* — Pegah Parvini
(74) *Attorney, Agent, or Firm* — Frank Gao, Esq

(57) ABSTRACT

A sintered cubic boron nitride (cBN) compact for use in a tool is obtained by sintering a mixture of (i) cubic boron nitride, (ii) aluminum oxide, (iii) one or more refractory metal compounds, and (iv) aluminum and/or one or more non-oxide aluminum compounds. The sintered bodies may have sufficient strength and toughness to be used as a tool material in solid, i.e. not carbide supported, form, and may be useful in heavy machining of cast irons.

14 Claims, 3 Drawing Sheets

SINTERED COMPACT

CROSS-REFERENCE TO RELATED APPLICATIONS

This application is a continuation-in-part of U.S. patent application Ser. No. 11/062,199 filed Feb. 18, 2005 now U.S. Pat. No. 7,932,199 which claims priority to U.S. provisional patent application No. 60/546,669 filed Feb. 20, 2004.

DETAILED DESCRIPTION

Figure 1:
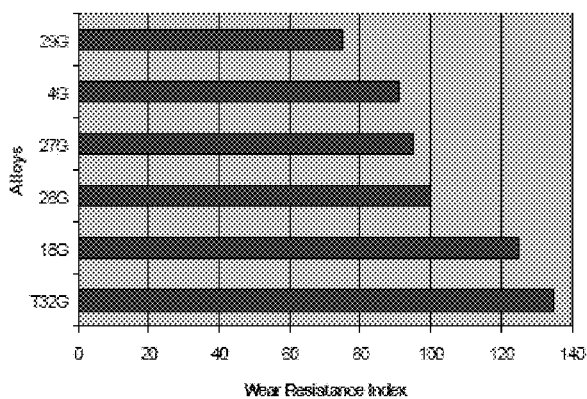
FIG. 1 is a graph showing the wear resistance of the alloys tested.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention which will be limited only by the appended claims.

It must also be noted that as used herein and in the appended claims, the singular forms "a", "an", and "the" include plural references unless the context clearly dictates otherwise. Thus, for example, reference to a "metal" is a reference to one or more metals and equivalents thereof known to those skilled in the art, and so forth.

Unless defined otherwise, all technical and scientific terms used herein have the same meanings as commonly understood by one of ordinary skill in the art. Although any methods and materials similar or equivalent to those described herein may be used in the practice or testing of embodiments of the present invention, the preferred compositions, methods, devices, and materials are now described. All publications mentioned herein are incorporated by reference in their entirety. Nothing herein is to be construed as an admission that the invention is not entitled to antedate such disclosure by virtue of prior invention.

In accordance with one embodiment, a sintered cubic boron nitride (cBN) compact with a cBN portion and a non cBN portion for use in a tool is obtained by sintering a mixture of: (i) about 70 to about 93 weight-% of cBN; (ii) about 1 to about 20% of aluminum oxide; (iii) about 3 to about 26% by weight of one or more refractory metal compounds; and (iv) about 3 to about 20% by weight of a source of non-oxide aluminum compounds. The refractory metal compounds may include one or more compounds having the general formula $MZ_{(1-x)}$, where Z is selected from the group consisting of C, B, or N, or combination thereof, M is a metal from Groups IV-VI of the periodic table, and x is a number between 0.01 and 0.99. A second type of refractory metal compound may have the general formula $MC_{(1-x)}N_x$, such as $TiC_{(1-x)}N_x$. A third type of refractory metal compound includes a combination or solid solutions of two or more compounds having the formula MZ or $MZ_2$. The compound may be a single compound or a combination of compounds, such as a mixture of at least two materials selected from the group of TiC, TiN, $TiB_2$, and $TiC_{(1-x)}N_x$. Other suitable compounds may also be used. The aluminum content in the non-cBN portion of the compact may comprise about 10 weight-% or more of the compact, although other compositions are possible. In an embodiment, the aluminum content in the non-cBN portion of the compact may comprise about 30 weight-% or more of the entire compact.

In another embodiment, the mixture may contain about 71 to about 93 weight-% of cBN, and in another embodiment the mixture may contain about 73 to about 93 weight-% of cBN. Similarly, in one embodiment the content of aluminum oxide may be about 3 to about 15%. Also, an embodiment of the mixture may contain about 8 to about 20% by weight of one or more refractory metal compounds. Further, an embodiment of the mixture may also contain about 3 to about 15% by weight of a source of non-oxide aluminum compounds. Other ranges of each of the materials in the mixture are possible.

In another embodiment, a sintered cBN compact with a cBN portion and a non cBN portion for use in a tool is obtained by sintering a mixture of: (i) about 50 to about 93 weight-% of cBN nitride, optionally with a multimodal grain size distribution, (ii) about 1 to about 30% of aluminum oxide, (iii) about 3 to about 46% by weight of one or more refractory metal compounds such as carbides, nitrides, borides, and/or carbonitrides of Groups IV-VI of the periodic table, which may include mixtures and/or solid solutions thereof, and (iv) about 3 to about 30% by weight of a source of non-oxide aluminum compounds, wherein the total aluminum content in the non cBN portion of the mixture exceeds about 10 weight-%. Further, in an embodiment, the sintered cBN compact contains less that about 3 weight-% tungsten. By way of example, in one embodiment, the carbides, nitrides, borides, and carbonitrides are carbonitrides may have formula $TiC_{(1-x)}N_x$, or they may include a mixture of at least two materials selected from the group of TiC, TiN, $TiB_2$, and $TiC_{(1-x)}N_x$. In each case, x is a number between 0.01 and 0.99.

In one variant, the cBN in the mixture may have a bimodal or multimodal grain size distribution. In an embodiment, the size distribution is about 20 to about 40 volume % of about 1 to about 3 micron-sized particles, about 10 to about 30 volume % of about 4 to about 6 micron-sized particles, about 10 to about 30 volume % of about 7 to about 9 micron-sized particles and about 20 to about 40 volume % of about 10 to about 20 micron-sized particles.

Note however, that other distributions, such as substantially homogenous distributions and seemingly random distributions, are possible The mixture may be prepared and sintered by any suitable method. For example, the components may be mixed with a solvent and/or or another suitable mixing media. The mixing should occur for a suitable time to thoroughly mix the materials, such as one hour for a 1000 g jar of material. Powder blends can be mixed before sintering by a variety of techniques, including, but not limited to, for example, ultrasonic mixing, ball mill mixing, attrition mill mixing, and the like. The choice of mixing technique may be influenced by the desire to introduce certain materials into the mixture or keep certain materials out of the mixture. Examples of such materials may include debris from the milling media balls (e.g., tungsten carbide debris from WC milling balls). Accordingly, in embodiments where tungsten carbide (which is a member of Group VI of the periodic table) is an ingredient, milling with tungsten carbide media may be used to introduce at least a fraction of the tungsten carbide content. The non-oxide aluminum may originate from a foil or other solid form of metallic aluminum placed in contact with a powder mixture during sintering.

Milling (i.e. mixing) may often conducted in the presence of or more solvents such as, for example, isopropyl alcohol or other alcohols, acetones, and/or other solvents. Preferably, the solvents can be readily removed and do not promote undesirable oxidation of the metal powders being milled. Milling temperatures may be ambient or non-ambient and times can range up to several hours or more. Depending on the size of the mixing apparatus, the blended mixtures can range in size from about 100 g to about 2 kg, or smaller or larger.

The blended mixture may be dried to remove the solvent, preferably at a temperature below the flash point of the solvent (e.g., isopropyl alcohol, acetone). The dried powder may be sieved through a 20-mesh screen (or another suitable sieve) to remove large agglomerates. The dried powder may be sintered using any suitable high pressure/high temperature (HP/HT) techniques and equipment, such as those known in the art and discussed above and in the prior art cited in Background section of this application. For example, the powder may be loaded in graphite or refractory metal or other cups (e.g., Ta or Nb). The cups may be loaded into a high pressure cell and subjected to high pressure (such as about 25 to about 75 kilobars) and high temperature (such as greater than about 1000° C.) for a suitable time (such as about 30 to about 40 minutes) to sinter the powder mixture into a coherent compact and, if necessary, braze it to a substrate. Other pressures and temperatures are possible to advance HP/HT sintering, as will be recognized by one of skill in the art. A support material (powder or compact) can be loaded into the cup for in situ bonding to the sintered compact, as is known in this art. Suitable substrates include, for example, refractory metal (e.g., tungsten) carbides. Alternatively, the compositions can be sintered in a non-carbide supported form, or, as in all examples described below, solid, unsupported form. In one embodiment, the sintered compact may have a grain size distribution that is bimodal or multimodal, although other distributions are possible. The size of the cup limits the size of the final sintered compact.

Any suitable sintering method may be used, such as the HP/HT methods described in the Background section of this document. During sintering, the binder phases chemically react with each other and the cBN to produce carbides, nitrides, carbonitrides, oxides, oxynitrides, and borides (e.g. $AlB_2$, AlN, $TiB_2$). The sintering of the mixture may also produce mixed-metal carbides, nitrides, carbonitrides, oxides, oxynitrides, and borides, (e.g. TiAlN, WCoB). These phases can be detected and identified in sintered compacts by X-ray diffraction techniques. The sintered blank may be removed from the cell and machined or otherwise formulated to remove the cup material and to bring it to the desired dimensions.

The finished blank, if sufficiently electrically conductive, can then be cut by into shapes and sizes suitable for the manufacture of cutting tools. Suitable cutting methods include electro-discharge machining (EDM) and other methods. Such tools may be used for machining powder metal iron and/or other materials. If not sufficiently conductive, laser cutting can be used to produce the desired shape for tool fabrication. The size and shape of the described sintered blanks can be varied by changing the dimensions of the components and are primarily limited in dimension by the HP/HT equipment used to promote the sintering process.

As noted above, the compact may have a bimodal or multimodal grain size distribution. For example, in an embodiment, the sintered compact has about 20 to about 40 volume % of about 1 to about 3 micron-sized particles; about 10 to about 30 volume % of about 4 to about 6 micron-sized particles; about 10 to about 30 volume % of about 7 to about 9 micron-sized particles; and about 20 to about 40 volume % of about 10 to about 20 micron-sized particles.

The sintered cBN compact may be useful in forming tools and tool inserts, such as are used in machining applications. For example, an embodiment of the cBN compacts may be used in heavy machining of cast irons or other chemically reactive materials. As used herein, "heavy machining" refers to applications where relatively large depths of cut are used, often approaching or exceeding 0.10 inches. In an embodiment, sintered cBN compacts may be used with machine cast iron materials that are chemically reactive with cBN, e.g. cast white irons, while maintaining large depths of cut and faster speeds.

Some embodiments of the sintered cBN compacts described herein may be useful in machining large forgings, such as pump housings or impellers, commonly used in the mining industry, e.g., oil extraction, etc. A metric comparing the cBN sintered compacts described herein is the useful life of the tool, which is determined by the quantity of machining it can complete before the surface finish of the machined metal becomes unacceptable. A second metric is the maximum machining speed in surface feet/min at which the tool material can perform in an application. Machining speed is one factor affecting material removal rate and thus impacts overall part fabrication cost. Examples of an embodiment of the cBN sintered compacts described herein have been tested and found to perform better than commercial compacts by a factor of more than 2 to 1 in tool life and enable machining speeds to be increased by as much as 50%.

EXAMPLES

In the examples, machining tests were conducted on three industrial castings having the properties described in Table 1, Table 2 and FIG. 1.

Figure 2:
FIG. 2 is a scanning electron microscope (SEM) image of the microstructure of one of the alloys tested.

The chemical specification of the alloys tested are given in Table 1. The mechanical properties of the alloys tested are shown in Table 2. The wear resistance of the alloys tests are show in FIG. 1. FIG. 2 is a scanning electron microscope (SEM) image of the microstructure of one of the alloys tested.

TABLE 1

| Chemical Specification | |
|---|---|
| Carbon | 2.6-2.4 wt % |
| Chromium | 26-24 wt % |
| Molybdenum | 3.0 wt % Max |
| Manganese | 2.0 wt % Max |

TABLE 2

| Mechanical Properties | |
|---|---|
| Tensile Strength | 60-100 KSI |
| Hardness (per ASTM A532) | ≧675 HB/60 HRC |

Tool performance was observed after completion of pre-programmed cutting distance.

Figure 3A:
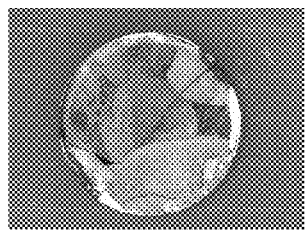
FIGS. 3a-3f are photographs of comparative inserts after machining large industrial castings.
Figure 3B:
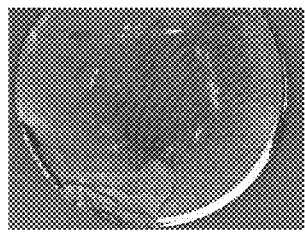
Figure 3C:
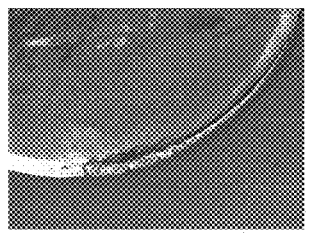

FIGS. 3a-3c show top views of a comparative inserts after machining casting A. As shown in FIG. 3a, significant cracking and chipping can be observed. FIG. 3b shows an insert with significant chipping. FIG. 3c shows an insert having edge crater wear.

Figure 3D:
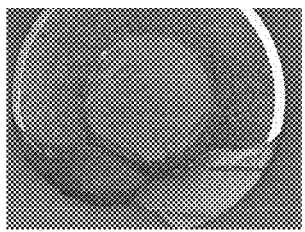
Figure 3E:
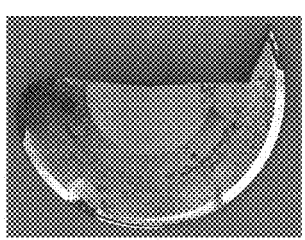
Figure 3F:
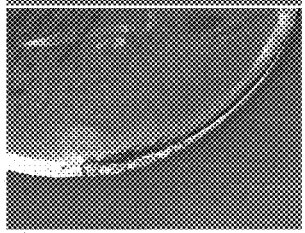

FIGS. 3d-3f show top views of a comparative inserts after machining casting B. As shown in FIG. 3d, the insert is fractured. FIG. 3e shows an insert that has failed. FIG. 3f shows a magnified insert having edge crater wear with cBN fractures.

Figure 4A:
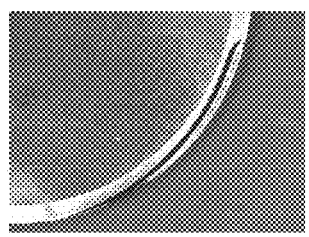
FIGS. 4a-4f are photographs of inserts produced according to an embodiment of the present invention after machining large industrial castings.
Figure 4B:
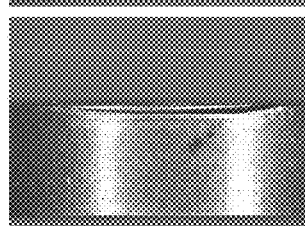
Figure 4C:
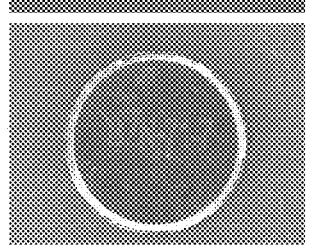

FIGS. 4a, 4c, 4d, 4e and 4f show top views of inserts produced according to an embodiment of the present invention after machining large industrial castings. FIG. 4a shows a magnified top view of an insert after machining casting C. Visible, but minor, crater wear can be observed. FIG. 4b shows a magnified side view of an insert after machining casting C. Minor cutting edge wear can be seen. FIG. 4c shows a top view of an insert after machining casting D showing minor crater wear.

Figure 4D:
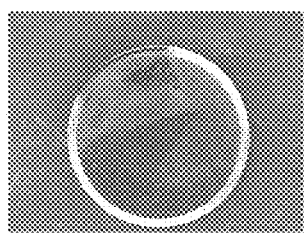
Figure 4E:
Figure 4F:
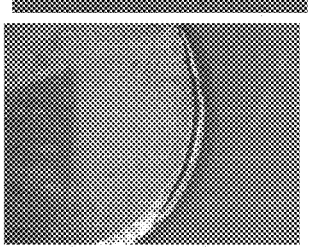

FIG. 4d shows a top view of an insert after machining casting E. Minor crater and edge wear can be observed. FIG. 4e shows a top magnified view of an insert after machining a casting D. Minor crater wear is seen. FIG. 4f shows a top magnified view of an insert after machining a casting E. Minor crater wear can be observed.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. For example, although all of the following examples use titanium compounds in the binder phase, it is well know to those skilled in the art that other metals in Groups IV-VI of the periodic table could be substituted for titanium with minimal impact on machining performance. Therefore, it is intended that the invention not be limited to the particular embodiment disclosed as the best mode contemplated for carrying out this invention, but that the invention will include all embodiments falling within the scope of the appended claims. All citations referred herein are expressly incorporated herein by reference.

The invention claimed is:

1. A compact with a cubic boron nitride (cBN) portion and a non cBN portion, the compact comprising:
   (a) between about 71 and about 93 volume-% cBN;
   (b) between about 1 and less than about 20 volume-% of aluminum oxide;
   (c) between about 3 and about 26 volume-% of one or more refractory metal compounds selected from the group consisting of:
      i. a compound having the general formula $MZ_{(1-x)}$;
      ii. a compound having the general formula $MC_{(1-x)}N_x$; and
      iii. a combination or solid solutions of two or more compounds each having the general formula MZ or $MZ_2$; wherein:
         Z is selected from the group consisting of C, B, N and combination thereof, M is a metal from any of groups IV-VI of the periodic table, and x is a number between 0.01 and 0.99; and
   (d) between greater than 6 and about 20 volume-% of a source of one or more non-oxide aluminum compounds;
wherein the total aluminum content in the non cBN portion of the sintered compact exceeds about 30 weight-% and wherein the total tungsten content is greater than 0 and less than 1 weight-%.

2. The compact of claim 1, wherein the one or more refractory metal compounds comprise at least one of $TiC_{(1-x)}N_x$, or a mixture of at least two materials selected from the group of TiC, TiN, $TiB_2$, $TiN_{(1-x)}$ and $TiC_{(1-x)}N_x$, wherein x is a number between 0.01 and 0.99.

3. The compact of claim 1, wherein the cBN has a grain size distribution that is at least bimodal.

4. The compact of claim 3, wherein the grain size distribution comprises:
   i) about 20 to about 40 volume % of about 1 to about 3 micron-sized particles;
   ii) about 10 to about 30 volume % of about 4 to about 6 micron-sized particles;
   iii) about 10 to about 30 volume % of about 7 to about 9 micron-sized particles; and
   iv) about 20 to about 40 volume % of about 10 to about 20 micron-sized particles.

5. The compact of claim 3, having a coarse portion comprising about 40% to about 80% of the cBN and a fine portion comprising about 20 to about 60% of the cBN;
   wherein the coarse portion has an average grain size of about 5 to about 30 μm and the fine portion has an average grain size of about 0 to about 10 μm; and
   wherein the ratio of the average grain size of the coarse portion to the average grain size of the fine portion is about 2:1 or greater.

6. The compact of claim 1, wherein the compact is in an unsupported form.

7. The compact of claim 1, wherein at least a portion of aluminum that forms the one or more non-oxide aluminum compounds originates from a foil or other solid form of metallic aluminum placed in contact with a powder mixture during sintering.

8. A compact with a cubic boron nitride (cBN) portion and a non cBN portion, the compact comprising:
   (a) between about 50 and about 93 weight-% of cBN with at least a bimodal grain size distribution;
   (b) between about 1 and about 30 weight-% of aluminum oxide;
   (c) between about 3 and about 46 weight-% of one or more compounds selected from the group consisting of carbides, nitrides, borides, and carbonitrides, all of groups IV-VI of the periodic table, and mixtures and solid solutions thereof; and
   (d) between greater than 3 and about 30 weight-% of one or more non-oxide aluminum compounds;
wherein the total aluminum content in the non cBN portion of the sintered compact exceeds about 10 weight-% of the compact and wherein the total tungsten content is greater than 0 and less than 1 weight-%.

9. The compact of claim 8, wherein the one or more compounds selected from the group consisting of carbides, nitrides, borides, and carbonitrides, are carbonitrides of the formula $TiC_{(1-x)}N_x$, or a mixture of at least two materials selected from the group of TiC, TiN, $TiB_2$, $TiN_{(1-x)}$ and $TiC_{(1-x)}N_x$, wherein x is any value between 0.01 and 0.99.

10. The compact of claim 8, further comprising:
   a coarse portion of about 40% to about 80% of the cBN; and
   a fine portion of about 20 to about 60% of the cBN;
   wherein the coarse portion has an average grain size of about 5 to about 30 μm;
   wherein the fine portion has an average grain size of about 0 to about 10 μm; and
   wherein the ratio of the average grain size of the coarse portion to the average grain size of the fine portion is about 2:1 or greater.

11. The compact of claim 8, wherein the compact is in an unsupported form.

12. The compact of claim 8, wherein at least a portion of aluminum that forms non-oxide aluminum compounds originates from a foil or other solid form of metallic aluminum placed in contact with the powder mixture during sintering.

13. A compact with a cubic boron nitride (cBN) portion and a non cBN portion, the compact comprising:
(a) between about 71 and about 93 volume-% cBN, wherein the cBN has a grain size distribution comprising:
  i) about 20 to about 40 volume % of about 1 to about 3 micron-sized particles;
  ii) about 10 to about 30 volume % of about 4 to about 6 micron-sized particles;
  iii) about 10 to about 30 volume % of about 7 to about 9 micron-sized particles; and
  iv) about 20 to about 40 volume % of about 10 to about 20 micron-sized particles;
(b) between about 1 and less than about 20 volume-% of aluminum oxide;
(c) between about 3 and about 26 volume-% of one or more refractory metal compounds selected from the group consisting of:
  i. a compound having the general formula $MZ_{(1-x)}$;
  ii. a compound having the general formula $MC_{(1-x)}N_x$; and
  iii. a combination or solid solutions of two or more compounds each having the general formula MZ or $MZ_2$; wherein:
    Z is selected from the group consisting of C, B, N and combination thereof, M is a metal from any of groups IV-VI of the periodic table, and x is a number between 0.01 and 0.99; and
(d) between greater than 3 and about 20 volume-% of a source of one or more non-oxide aluminum compounds; wherein the total aluminum content in the non cBN portion of the sintered compact exceeds about 30 weight-% and wherein the total tungsten content is less than about 3 weight-%.

14. A compact with a cubic boron nitride (cBN) portion and a non cBN portion, the compact comprising:
(a) between about 71 and about 93 volume-% cBN, wherein the cBN has a grain size distribution comprising:
  i) about 20 to about 40 volume % of about 1 to about 3 micron-sized particles;
  ii) about 10 to about 30 volume % of about 4 to about 6 micron-sized particles;
  iii) about 10 to about 30 volume % of about 7 to about 9 micron-sized particles; and
  iv) about 20 to about 40 volume % of about 10 to about 20 micron-sized particles;
(b) between about 1 and less than about 20 volume-% of aluminum oxide;
(c) between about 3 and about 26 volume-% of one or more refractory metal compounds selected from the group consisting of:
  i. a compound having the general formula $MZ_{(1-x)}$;
  ii. a compound having the general formula $MC_{(1-x)}N_x$; and
  iii. a combination or solid solutions of two or more compounds each having the general formula MZ or $MZ_2$; wherein:
    Z is selected from the group consisting of C, B, N and combination thereof, M is a metal from any of groups IV-VI of the periodic table, and x is a number between 0.01 and 0.99; and
(d) between greater than 3 and about 20 volume-% of a source of one or more non-oxide aluminum compounds; wherein the total aluminum content in the non cBN portion of the sintered compact exceeds about 30 weight-%.

* * * * *